April 6, 1965 W. PÜTZER 3,177,453

VARIABLE LINE-ABOVE-GROUND TUNING DEVICE USING MOVABLE CONTACT

Filed Nov. 2, 1960 2 Sheets-Sheet 1

INVENTOR.
WALTER PUTZER
BY
Frank R. Trifari
AGENT

INVENTOR.
WALTER PUTZER
BY
Frank R. Trifari
AGENT

United States Patent Office 3,177,453
Patented Apr. 6, 1965

3,177,453
VARIABLE LINE-ABOVE-GROUND TUNING DEVICE USING MOVABLE CONTACT

Walter Pützer, Krefeld, Germany, assignor to North American Philips Company, Inc., New York, N.Y., a corporation of Delaware Filed Nov. 2, 1960, Ser. No. 66,811
Claims priority, application Germany, Nov. 11, 1959, P 23,859; Apr. 16, 1960, P 24,843
9 Claims. (Cl. 333—82)

This invention relates to tuning devices, more particularly for the high-frequency amplifying stage of a television receiver, comprising a substantially circular line, the natural frequency being variable by means of a rotary contact member.

Known devices of this kind are designed so that the capacitance of the line remains unchanged. Tuning was effected by shifting a short-circuiting bridge between the two conductors of the line. In this case the difficulty arises that a slidable contact must be provided at the very place where the highest high-frequency current flows (current anti-node). Thus to permit an adjustment reproducible at least to a certain extent, special measures had to be taken.

In a tuning device of the kind mentioned in the preamble, these disadvantages are avoided and very accurate tuning may be obtained with the use of simple contact if, according to the invention, an adjustable short-circuit between two points of the same conductor is established by means of a contact bridge.

The present invention is based upon the recognition that the displacement of a short-circuiting bridge and the resulting contact difficulties may be avoided if the electrical length of the line is varied in a manner known per se. In the case of rectilinear lines, such a variation in length has been carried out, for example, by forming the line as telescoping concentric tubes. In the present invention, however, a portion of the circular line is bridged by a disk-shaped or annular element and thus made inoperative.

This also results in a variation of the capacitative load, since shortening the active portion by means of the bridged part of the line results in an increase of the capacitance at the end of the line, which is determined in the first place by the circular portion of the line. However, increasing the output capacitance also results in an increase of the apparent electrical length of the device. Consequently, upon tuning to higher frequencies (shorter waves), the increase in the output capacitance counteracts the shortening of the length of the line effected by means of the sliding contact. A spread of the tuning scale thus occurs at high frequencies. In fact, while the indication on the scale, if only the length of the line is varied in proportion to the displacement, varies in proportion to the wavelength and hence in inverse relationship to the frequency, it may be achieved by the influence of the increase in capacitance at the end of the line that the indication varies in proportion to frequency (in the opposite sense). It may thus be ensured that the desired frequency channels on a scale connected to the sliding contacts are approximately equidistant.

In order that the invention may be readily carried into effect, it will now be described in detail, by way of example, with reference to the accompanying diagrammatic drawings.

In the drawing:

FIGS. 1*a*, 1*b*, and 1*c* are illustrations of a tuning device according to the invention shown in three different positions;

FIGS. 2*a*, 2*b*, and 2*c* are views of the equivalent inductive and capacitive portions of the devices of FIGURES 1*a*, 1*b*, and 1*c*, respectively;

Figure 1A:
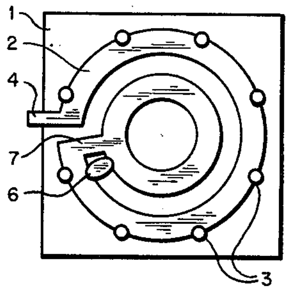

A substantially circular line 2 of metal strip is arranged by means of insulating supports 3 above a base plate 1, for example approximately square, of conductive material. The plate 1 may comprise a first terminal of the device as is apparent from the equivalent circuit of FIG. 3. The open beginning of the line 2 is led to the exterior at 4, which may comprise a second terminal for the device and may be connected there to further circuit elements. The other end of the line 2 may also be led to the exterior and be provided with a connection.

The insulation between the plate 1 and the line 2 may alternatively be obtained with the aid of sheet-like material, as is common practice, for example, in the printed circuit technique.

Inside the line 2 there is arranged an annular or disc-shaped conductor 5 which is electrically connected through a bridge 7 to the end of the line 2. Between the outer edge of the piece of line 5 and the inner edge of the line 2 there is provided a sliding contact 6 which establishes an electrical connection between the two edges.

Figure 2A:
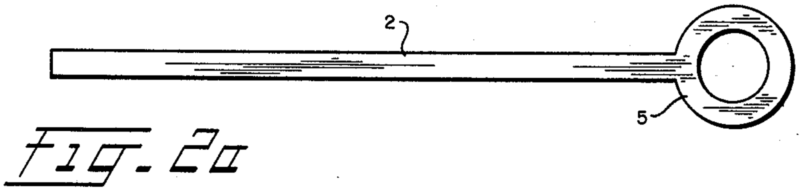

In the position shown in FIGURE 1*a*, the line 2 constitutes relative to the plate 1 a Lecher line, to the end of which is connected, via the bridge 7 and the contact 6, the piece of line 5, which acts as a capacitance relative to the plate 1. When the active portion of the line is unwound, a device is obtained as shown in FIGURE 2*a*. The conductor 2 is thus active as a tuned line for the desired resonance almost through its full length. Its active length is slightly increased further by the capacitance between the piece of line 5 and the plate 1.

Figure 1B:
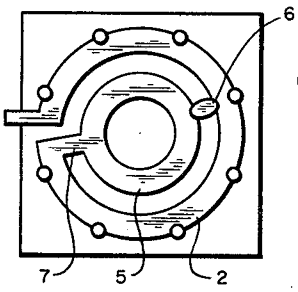
Figure 2B:
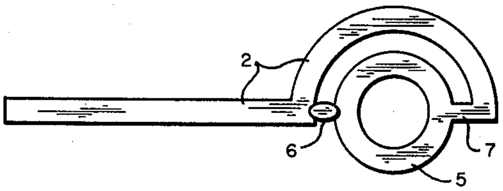

When the sliding contact 6 of FIGURE 1*b* is rotated by approximately 180° and, as before, the active portion of the line 2 is unwound, a device ensues as shown in FIGURE 2*b*. The active portion of the line is shortened approximately by half. The inactive portion of the line 2, which is bridged by the piece of line 5, is still active relative to the plate 1, with its capacitance only, thus increasing the capacitative load between the end of the active part of the line 2 and the plate 1.

Figure 1C:
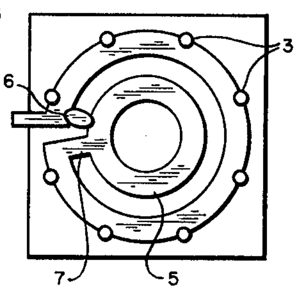
Figure 2C:
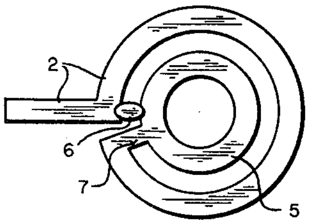

If the sliding contact 6 is placed on the beginning of the line as in FIGURE 1*c*, only a very short active line results as shown in FIGURE 2*c*, and the capacitance at the end of the active part of the line 2 with respect to plate 1 is considerably increased by the natural capacitance of the bridged portion of the line 2.

It is, of course, also possible, instead of using the asymmetric line shown in FIGURE 1, to form the device symmetrically.

Figure 3:
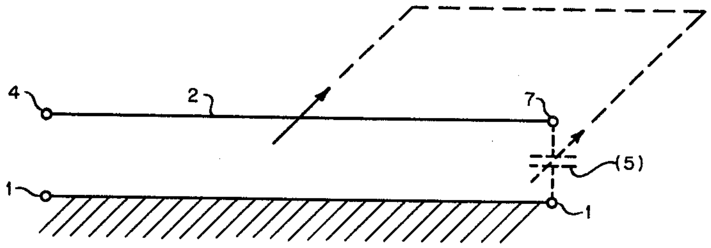
FIG. 3 is an equivalent circuit of the device of FIG. 1.

The operation of the device shown in FIGURES 1 and 2 may be illustrated by the substitution diagram of FIGURE 3. The input of the line is represented by a connecting terminal 4 relative to the plate 1, whereas its end is connected to the bridge 7. By shifting the sliding contact 6, the length of the line between the points 4 and 7 and the capacitance at the end thereof are varied, the two variations being coupled together so that shortening on the line 2 results in an increased capacitance at the end thereof.

A tuning device according to the invention may be used in known manner as a resonant element in the form of a capacitatively-loaded Lecher line. Its input may be connected through a further connecting line, also to be taken into account as a tuning element, to the output or the input of an amplifying element, for example the anode of an electronic tube. Instead of being connected to the points 4 and 1, a device according to the invention may be connected to the said further connecting line at the points 7 and 1. However, it may in this case be necessary to choose the connecting line of a different length in order to obtain resonance at the desired frequency, but it is fundamentally possible, also for this different length, to effect tuning on the principle of an open Lecher line.

Figure 4:
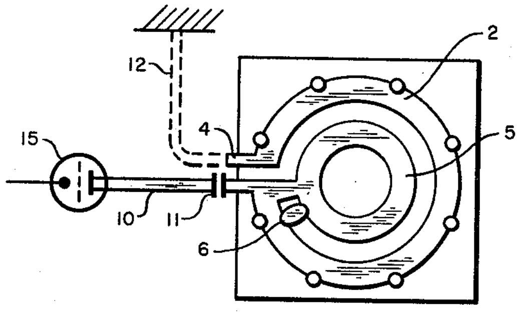
FIG. 4 is a circuit diagram of one application of the device of FIG. 1.

A shortening of the portion of a Lecher line adjusted to resonance, which is to be connected externally, is caused by the internal capacitance of the line connected, for example of the output of an amplifying element. Such shortening may be undesirable, since the possibility of varying the tuning by varying the length is thus decreased. It is therefore preferable to include a series-capacitor in the connecting line. It is then possible to connect externally a considerably longer line, the effective length of which is apparently shortened by the capacitor. Particularly favourable results are obtained if the shortening capacitor is arranged in close proximity to the line 2, for example at the beginning 4 thereof, or near the bridge 7. Such a device is shown in FIGURE 4.

In this device, the anode of an amplifier tube 15 is connected through a connecting line 10 to a tuning device according to the invention, that is to say to that end where the piece of line 5 is connected to the line 2 through the bridge 7. A shortening capacitor 11 is arranged in direct proximity to the bridge 7.

In the devices described so far, the Lecher line was substantially unloaded at its end. However, in a device according to the invention, it is also possible to effect tuning in the manner of $\lambda/4$-lines, the end of the line then being short-circuited. For this purpose, one end of the line 2 would have to be connected through an additional piece of line 12 to earth, that is to say preferably to the plate 1. In this device it is ensured that the greatest current flows at the end of the auxiliary line 12 and hence at an area where a fixed contact is provided. The sliding contact 6, by means of which the effective length of the line 2 may be varied, is positioned near a voltage anti-node and is thus loaded only very slightly by the high-frequency current. It is thus possible, even when using a $\lambda/4$-line, to utilize a sliding contact which may be of a comparatively simple design and nevertheless always functions irreproachably.

The piece of line 12 must have a length preferably noticeably smaller than a quarter of the operating wave-length and preferably about 1% to 10% of the operating wave-length. The term "operating wave-length" is to be understood to mean the value given by the distance between the nodes, which value is usually smaller if the conductive portions of the line are separated by a dielectric having a dielectric constant noticeably higher than unity. If tuning is effected over a large range, for example between 470 mc./s. and 900 mc./s. with television, the shortest wave-length must be chosen for proportioning the piece of line 12.

Figure 5:
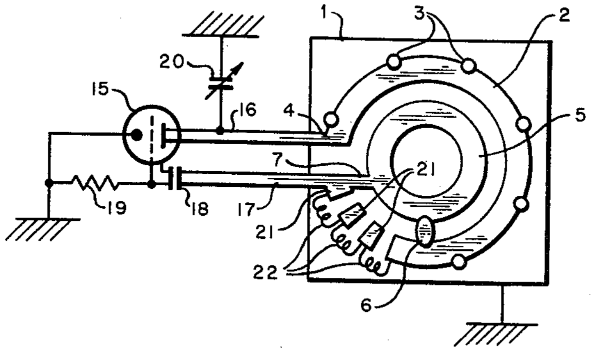
FIG. 5 is a circuit diagram of an oscillator employing the device of FIG. 1.

A tuning device according to the invention may also be used in an oscillator circuit in which symmetrical voltages are necessary for controlling an amplifier element. One embodiment thereof is shown in FIGURE 5.

In this figure the beginning 4 and the bridge 7 of a tuning device according to the invention are connected to the output and the input of an amplifier element, in this example the anode and the grid of an electronic tube 15, through connecting leads 16 and 17 respectively. Also connected to the grid of the tube 15 are a blocking capacitor 18 and a grounded leak resistor 19. The cathode of tube 15 is also connected to earth. Furthermore, a neutralizing capacitor 20 is included between the anode of tube 15 and earth. The plate 1 of the tuning device is also grounded.

In the device shown, voltages of opposite phase are set up across the ends of the tuned Lecher line, which is constituted by line portions 16 and 17 and the tuning device, resulting in the oscillator oscillating approximately on the principle of the Colpitts circuit. The tuning frequency may be varied by shifting the contact 6.

To receive oscillations of lower frequency in predetermined ranges, it may be preferable for the line 2 of the tuning device to be lengthened in known manner with fixed inductances which are switched successively into circuit.

This is shown in FIGURE 5. The end of the line 2 is provided with interruptions resulting in contact strips 21 between which extension pieces 22 are provided. The latter may be either in the form of loops, or helically-wound pieces of wire.

Such step-wise lengthenings of the line 2, as shown in FIGURE 5, is also applicable to the device shown in FIGURES 1 and 4.

A tuning device according to the invention may also be used for coupling two sequential amplifier stages, where two devices may be united into one band-pass filter.

What is claimed is:

1. A tuning device comprising an annular conductor having first and second ends, a closed conductor ring concentric and coplanar with said annular conductor, fixed means radially connecting said second end to said conductor ring, radially extending shorting means between said conductor ring and said annular conductor, and a fixed conducting plate axially spaced from said conductor ring and annular conductor and insulated therefrom, said shorting means being circumferentially adjustable, whereby variation in length of the portion of said annular conductor between said first end and said shorting means with adjustment of said shorting means is accompanied with opposite variation of the capacitance between the remainder of said annular conductor and said conducting plate.

2. A tuning device comprising a pair of terminals, an annular conductor having first and second ends, means connecting said first end to one of said terminals, a closed conductor ring concentric and coplanar with said annular conductor, conductive means radially connecting one of said ends to said ring, circumferentially adjustable shorting means connecting said annular conductor to said ring, and a fixed conductive plate connected to said second terminal, said plate being axially spaced from said annular conductor and insulated therefrom.

3. The device of claim 2 in which said ring has a smaller diameter than said annular conductor.

4. A tuning device comprising a pair of terminals, a single turn conductor having one end connected to one of said terminals, a closed conductor ring concentric and coplanar with said single turn conductor and having a smaller diameter than said single turn conductor, a fixed conductor bridge extending radially between said ring and the other end of said conductor turn, a circumferentially adjustable bridge extending radially between said single turn conductor and said ring, and a fixed conducting plate axially spaced from said single turn conductor and insulated therefrom, said conducting plate being connected to the other of said terminals.

5. The device of claim 4 comprising capacitor means connected between said terminals.

6. The device of claim 4 comprising a plurality of inductances and means for successively introducing said inductances serially in said single turn conductor.

7. A tuning device comprising first and second terminals, an annular conductor having first and second ends, means connecting said first end to said first terminal, a flat conductive member having a circular periphery with a diameter less than said annular conductor, said member being positioned coaxially and coplanar with respect to said annular conductor, conductive means connected between one of said ends and said member, circumferentially adjustable shorting means connected between said annular conductor and said member, a fixed conducting plate axially spaced from said annular conductor and insulated therefrom, and means connecting said second terminal to said conducting plate.

8. A high frequency tuning device comprising a fixed conductive plate, an annular conductor spaced from said plate and having first and second ends, a planar conductive member coplanar with said annular conductor, said member having a circular periphery with a diameter less than the diameter of said conductor and being coaxial with said conductor, a fixed conductive connection between said second end and said member, and radially extending shorting means connected between said annular conductor and member, said shorting means being circumferentially adjustable, whereby said device forms a capacitively loaded Lecher line between said first end and said plate, and the active length of said line varies inversely with respect to the capacitive loading of the line with circumferential adjustment of said shorting means.

9. A high frequency tuning device comprising a fixed conductive plate, an annular conductor spaced from said plate and having first and second ends, a planar conductive member coplanar with said annular conductor, said member having a circular periphery with a diameter less than the diameter of said conductor and being coaxial with said conductor, a fixed conductive connection between said second end and said member, a radially extending shorting means connected between said annular conductor and member, said shortening means being circumferentially adjustable, and means connecting said first end to said conductive plate, whereby said device forms a short circuited Lecher line between said plate and said second end of said annular conductor.

References Cited by the Examiner

UNITED STATES PATENTS

| | | | |
|---|---|---|---|
| 2,126,541 | 8/38 | De Forest | 333—82 |
| 2,482,393 | 9/49 | Wilburn | 334—66 |
| 2,513,392 | 7/50 | Aust | 333—82 |
| 2,513,393 | 7/50 | Frey et al. | 333—41 |
| 2,765,447 | 10/56 | Hesse | 250—40 |
| 2,915,717 | 12/59 | La Rosa | 333—84 |

HERMAN KARL SAALBACH, *Primary Examiner.*

SAMUEL B. PRITCHARD, *Examiner.*